No. 741,194. PATENTED OCT. 13, 1903.
H. VON UFFEL & G. E. LENGERT.
DEVICE FOR STONING CHERRIES.
APPLICATION FILED MAY 31, 1902.
NO MODEL.

WITNESSES:
Jno. G. Cross
Edw. W. Vaill Jr.

INVENTORS:
Herman von Uffel,
and George E. Lengert,
by Horace Pettit
ATTORNEY.

THE NORRIS PETERS CO., PHOTO-LITHO., WASHINGTON, D. C.

No. 741,194. Patented October 13, 1903.

UNITED STATES PATENT OFFICE.

HERMAN VON UFFEL AND GEORGE E. LENGERT, OF PHILADELPHIA, PENNSYLVANIA.

DEVICE FOR STONING CHERRIES.

SPECIFICATION forming part of Letters Patent No. 741,194, dated October 13, 1903.

Application filed May 31, 1902. Serial No. 109,627. (No model.)

*To all whom it may concern:*

Be it known that we, HERMAN VON UFFEL and GEORGE E. LENGERT, citizens of the United States, and residents of the city of Philadelphia, State of Pennsylvania, have invented certain new and useful Improvements in Devices for Stoning Cherries, of which the following is a full, clear, and exact description, reference being had to the accompanying drawings, forming part of this specification.

Our invention relates to an improved device for stoning or seeding cherries, and has for its object to generally improve and simplify the construction and operation of devices of this character.

With this end in view our invention consists in providing a frame, preferably made of steel wire bent in such a manner as to form a holder for the cherry-receptacle and having one end of said wire so shaped as to form a spring-arm adapted to carry the plunger and serving to return said plunger to normal position during the operation of same and having its other end bent into a spring guard-arm having a loop through which the plunger works, said guard performing the functions of guiding the plunger during its operation, also serving as a stop to limit the downward movement of the plunger and as a spring to assist in its return movement, and, further, in serving to remove or release the cherry from the end of the plunger after said plunger has removed the seed or stone therefrom.

Our invention further consists in providing a bowl adapted to receive and hold the cherry while the plunger is acting on the same to remove the stone, which is so constructed as to prevent the mutilation of the cherry during the engagement with it by the plunger to any great extent.

In most devices of this character while the stone is effectively removed from the cherry the fruit itself is badly mutilated and punished and a large portion of the meat is wasted or destroyed, while in our device this objection is almost completely avoided.

In order that the construction and operation of our device may be fully understood and appreciated, the accompanying drawings are provided, in which—

Figure 1:
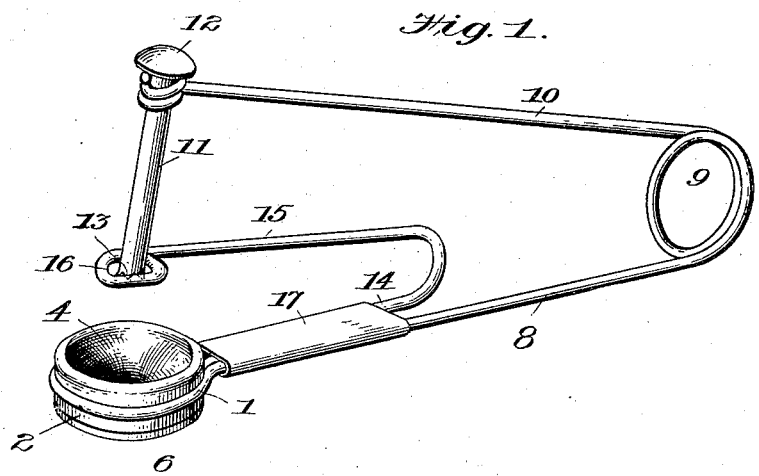
Figure 2:
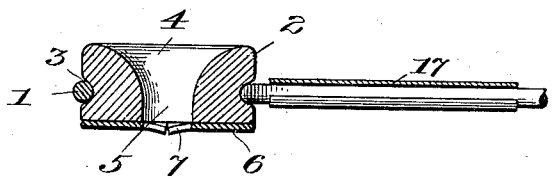

Figure 1 represents the device in perspective. Fig. 2 is a detail section through the bowl and its holder, and Fig. 3 is a plan view of the bowl and its holder.

In carrying out our invention we provide a frame, preferably comprising a stiff wire bent into a loop 1, which serves as a holder for the bowl 2. The bowl 2 is made of wood, porcelain, or other suitable material and is provided in its exterior with an annular groove 3, into which fits the wire forming the loop 1. The bowl is preferably convex at its upper interior surface, as shown at 4 in the drawings, and tapers into a bore 5 as it nears the bottom, which bore is of a size sufficient to permit the passage of a cherry-stone.

Figure 3:
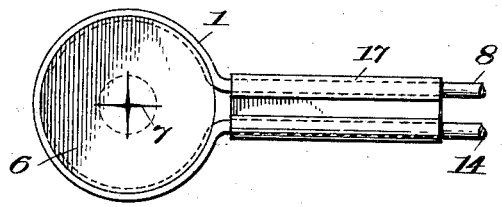

On the bottom of the bowl 2 is a disk 6, preferably made of rubber or leather, having splits 7 disposed transversely to each other, as shown in Fig. 3 of the drawings. These splits are of a length extending across the diameter of the bore 5 and being of flexible material allow the cherry-stone to be forced therethrough and at the same time serve to prevent the passage of the pulp.

One section of the wire forming the loop 1 extends in a straight line for a short distance, forming the portion 8, and is then bent into a coil 9 and then extends forwardly, forming the portion 10, to a point over the bowl 2, where its free end is tightly coiled around the plunger-rod 11. This plunger 11 is provided with a rounded head 12, against the under side of which the coil or other means of support carried by the frame-section 10 bears. The lower end of the plunger is provided with serrations 13, as shown in Fig. 1. The other wire, extending from the loop 1, is shaped to form a member 14, parallel with the wire 8 for a distance about half the length of said wire 8, when it is then curved and bent forwardly, forming an arm 15, which terminates in a slightly-elongated loop 16, located over the center of the bowl 2. The plunger 11 extends into this loop and is guided thereby during its operation. Said loop also acts as a clearer for said plunger to remove the fruit therefrom should it adhere to the plunger. A thin metallic plate 17 is provided over the two parallel wires 8 and 14, having its side edges bent around each of said wires, as shown in Figs. 2 and 3, and serves to hold the two wires in their proper positions and keep the loop 1 in engagement with the groove 3 of the bowl. By disengaging this plate 17 the wires 8 and 14 will spring apart and permit the removal of the bowl.

In operation the device is grasped, say, by the right hand, with the thumb resting upon the plunger-head 12, and after a cherry is placed in position in the bowl the plunger is operated by pressing the same down with the thumb until the serrated end of the plunger comes in contact with the cherry and forces the seed through the bore 5 and splits 7. The spring 9, between the arms 8 and 10, serves, with the assistance of the arm 15, to return the plunger to its normal position, and the loop 16 serves as a guide for the plunger and also serves to pull the cherry-pulp off of the said plunger after the stone has been removed.

The device is exceeding simple in its construction and very effective in its operation and on account of its simplicity can be manufactured at a very small cost.

We do not wish to be limited to the precise construction herein shown and described, as it is quite evident that various modifications could be made in the details of construction.

We claim—

1. A fruit-stoning device comprising a bowl or holder, a clip, a plunger, and a frame formed of a single wire bent into a loop embracing the bowl, said loop and bowl being held by the clip, and the ends of the wire being formed into a holder and a clearer for the plunger.

2. A fruit-stoning device comprising a bowl or holder having spring-fingers over the opening in the bottom thereof, a clip, a plunger, and a frame formed of a single wire bent into a loop embracing the bowl, said loop and bowl being held by the clip, and the ends of the wire being formed into a holder and a clearer for the plunger.

In witness whereof we have hereunto set our hands this 28th day of May, A. D. 1902.

HERMAN VON UFFEL.
GEORGE E. LENGERT.

Witnesses:
JOHN F. GRADY,
JNO. T. CROSS.